Patented Aug. 11, 1925.                                              1,549,260

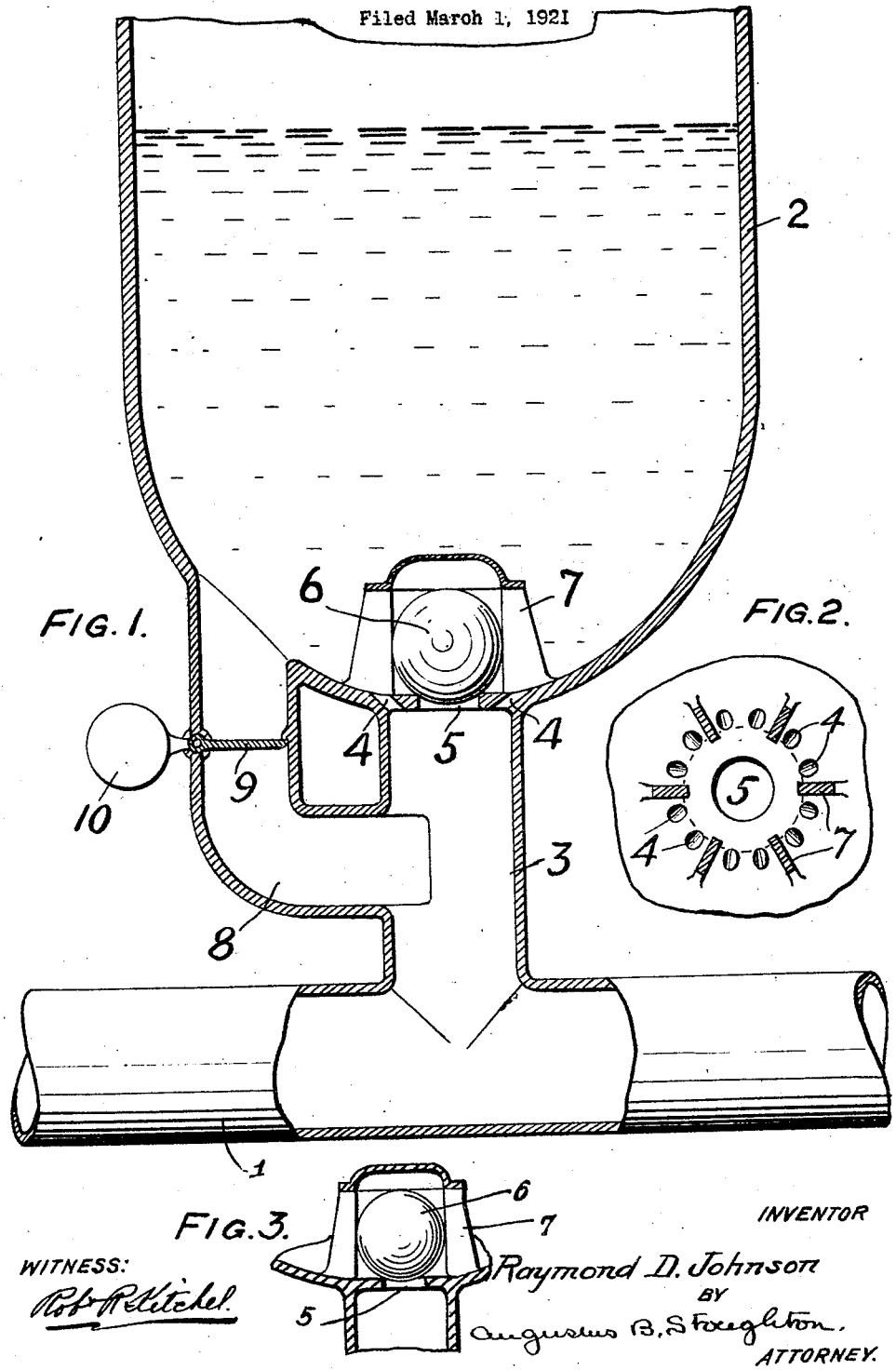

UNITED STATES PATENT OFFICE.

RAYMOND D. JOHNSON, OF NEW YORK, N. Y.

SURGE TANK FOR PIPE LINES.

Application filed March 1, 1921. Serial No. 448,936.

*To all whom it may concern:*

Be it known that I, RAYMOND D. JOHNSON, a citizen of the United States, residing at New York, in the county of New York and State of New York, have invented certain new and useful Improvements in Surge Tanks for Pipe Lines, of which the following is a specification.

The principal object of the present invention is to provide a surge tank of comparatively small size which will promptly regulate for normal changes in load on the supply pipe or conduit as well as for abnormal changes in load on the supply pipe or conduit without permitting the latter to be subjected to undue pressure. To this and other ends hereinafter set forth, the invention comprises a surge tank having a restricted opening for connection to a conduit, or restricted conduit-opening, which automatically adjusts its effective area to take care of the variable requirement of the plant during operation.

The invention also comprises the improvements to be presently described and finally claimed.

In the accompanying drawing, forming part hereof

Figure 1 is an elevational view, partly in section,

Fig. 2 is a top or plan view with some parts removed and some parts in section.

Figure 3 is a fragmentary sectional view illustrating a modification.

In the drawings 1 is the conduit or pipe line supplying a plant, 2 is the surge tank and 3 is a connection between the conduit and the tank. These parts are well known.

At the base of the tank ports 4 are provided of such cross-sectional area that the head required to force water through them under a normal load change is approximately the difference between the elevation of the water in the tank corresponding to the load existing before the change and the level in the tank which will exist after the load change when conditions have become again quiescent. A central port 5 is also provided in the bottom of the tank upon which a weighted sphere 6 rests and acts as a valve. The weight of this sphere is a little more than sufficient to keep it seated against the artificial head required to force water through ports 4 as already described. Sphere 6 is contained in a cage 7 which retains it in proper position when it is lifted from its seat.

Under normal decreases of load which force water into the tank through ports 4, sphere 6 will remain seated due to its weight and the rejected water will pass through ports 4 in the manner intended. If, however, the rejection of load is greater than normal such, for example, as a complete shut-down of the plant, the head required to force the augmented quantity of rejected water through ports 4 will be greater than under normal conditions and sphere 6 will be lifted from its seat permitting the additional rejected water to pass through port 5 thus preventing an excess of pressure on the pipe line.

In case of increased loads where water must be drawn from the tank it will have to pass through ports 4 since sphere 6 opens only to permit water to enter the tank. This, however, is ordinarily a satisfactory arrangement because the increases of load are relatively small. If, however, it is necessary to provide for large instantaneous increases of load, a by-pass from the tank to the conduit may be provided such as 8, and this by-pass is equipped with a single acting weighted valve corresponding to sphere 6 but opening only to permit flow from the tank to the pipe line. Such a valve 9 is illustrated, the weight 10 being such that the valve opens only under a head greater than that required to force water through ports 4 under a normal load change.

From the foregoing it is evident that I have provided a restricted opening between a conduit and a surge tank which automatically adjusts itself to take care of the variable requirements of the plant during operation. It is obvious that a great many different formal arrangements might be provided for doing this; for instance referring to Fig. 3, ports 4 might be eliminated entirely using only port 5 and adjusting the weight of the sphere 6 so it would open sufficiently to pass the required water under a normal load change without causing any more excess pressure than is desirable, but at the same time would open wider under greater load changes and discharge the extra water without undue back pressure. Therefore the invention is not limited to mere matters of form or arrangement, or otherwise than as the prior art and the appended claims may require.

I claim:

1. A surge tank having a permanent conduit-opening and provided with means responsive to pressure and adapted to automatically increase and decrease the effective area of the opening.

2. A surge tank having a permanent conduit-opening and provided with self-closing means responsive to pressure and adapted to automatically increase and decrease the effective area of the opening.

3. A surge tank having a permanent conduit-opening for normal fluctuations and a conduit-opening for abnormal fluctuations and provided with means tending to close the last mentioned opening and responsive to conduit pressure to open it.

4. In a surge tank the combination of a permanently open conduit connection, and a normally closed conduit connection adapted to automatically open for ingress in response to abnormal rise in conduit pressure, substantially as described.

RAYMOND D. JOHNSON.